UNITED STATES PATENT OFFICE.

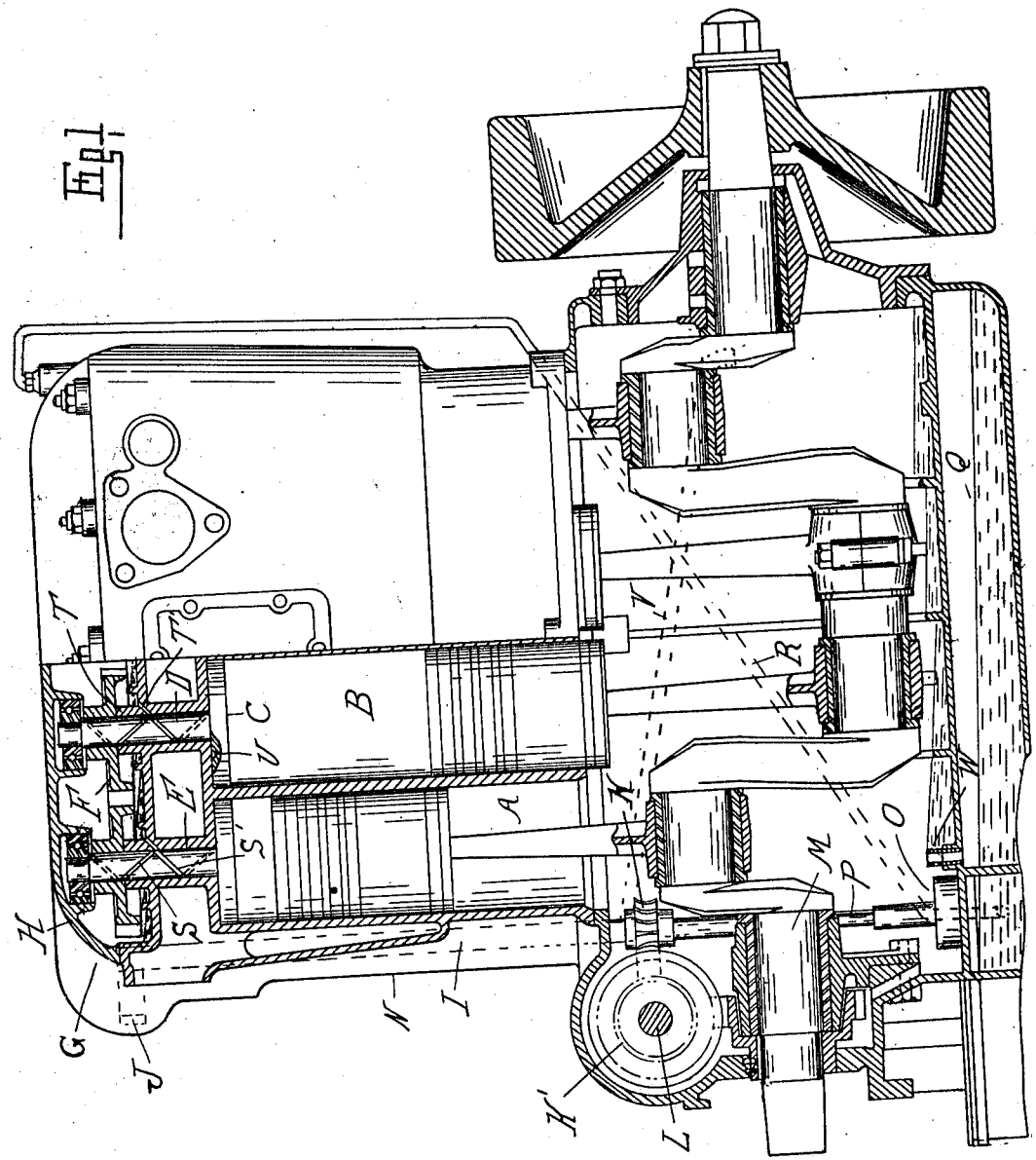

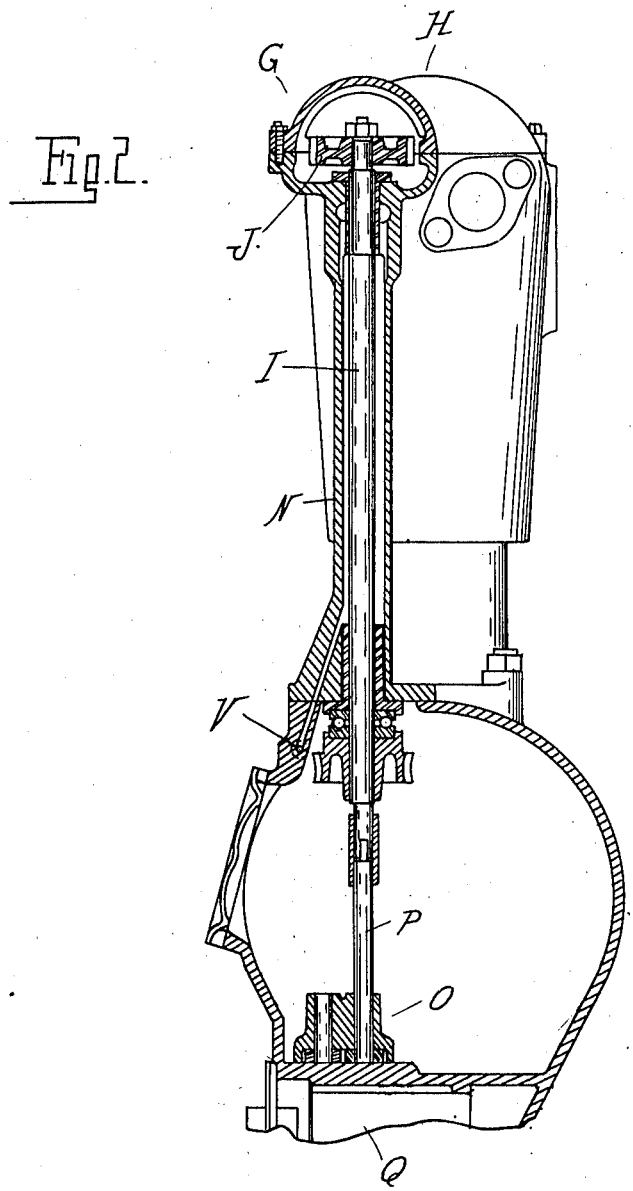

CECIL HAMELIN TAYLOR AND HOWARD E. COFFIN, OF DETROIT, MICHIGAN.

LUBRICATING SYSTEM FOR EXPLOSION-ENGINES.

1,026,287.  Specification of Letters Patent.  Patented May 14, 1912.

Application filed June 27, 1910. Serial No. 569,205.

*To all whom it may concern:*

Be it known that we, CECIL HAMELIN TAYLOR and HOWARD E. COFFIN, citizens of the United States of America, residing at Detroit, in the county of Wayne and State of Michigan, have invented certain new and useful Improvements in Lubricating Systems for Explosion-Engines, of which the following is a specification, reference being had therein to the accompanying drawings.

The invention relates to lubricating systems more particularly designed for use in explosion engines which are provided with rotary valves for controlling the inlet and exhaust passages.

The invention consists in the means for distributing the lubricant to the valves, their operating mechanism and to the crank case, and, further, in the peculiar construction of the parts as hereinafter set forth.

In the drawings—Figure 1 is a vertical longitudinal section through an engine to which our lubricating system is applied; Fig. 2 is a section at right angles to Fig. 1 through the combined transmission housing and lubricant channel.

A is the engine casing comprising a plurality of cylinders B.

C are rotary valves of the disk type arranged within each cylinder at the upper end thereof.

D is a rotary shaft or stem for operating the valves which extend outward through a bearing in the head E of the cylinder.

F are gear wheels secured to the shafts D and intermeshing with each other, and G is a housing for said gears preferably having a detachable cap H. The gears G are driven from the crank shaft of the engine through the medium of a transmission preferably comprising a vertical shaft I arranged adjacent to the cylinder at one end of the casing, and offset to one side of the plane of the crank shaft. This shaft has at its upper end the pinion J meshing with the end gear F, and near its lower end the shaft is connected by spiral gears K and K' with a transverse shaft L which in turn is connected by spiral gears to the crank shaft M. The shaft I is inclosed by a suitable housing N, and the gears are also inclosed by a casing.

Our lubricating system includes the ordinary splash system for the crank case and also a distributing means for supplying lubricant to each of the valves and the operating mechanism therefor. For the latter purpose, the lubricant is first elevated by a pump O preferably located in the crank case and by an extension P of the shaft I. The oil is drawn from a storage chamber Q below the crank case and is propelled through a conduit R to the housing G at one end thereof. From this point, it is fed by gravity to the opposite end of the casing successively lubricating the gears F and the stems T of the valves. These stems are preferably provided with spiral grooves and, as shown, these grooves have oppositely pitched portions S S', which propel the lubricant upward and downward along the stem from the point of the first contact. To insure equal lubrication for each valve regardless of the tilting of the engine case in different directions, annular flanges T are arranged around each stem which form a well or pool for retaining the lubricant. From this pool a duct T' extends downward to the point of the reversely pitched grooves S S', and thus the lubricant is fed both ways along the stem. At the lower end of the stem, the lubricant is fed between the face of the valve and the seat upon the cylinder head, and if desired a spiral groove U may be arranged in the face of the valve to propel the lubricant outward toward the periphery.

At the opposite end of the casing G from that with which the conduit R is connected is a tubular housing N through which the transmission shaft I extends. This tubular housing forms also an oil duct for receiving the lubricant from the casing G and conveying it to the crank case. At the lower end of the tubular housing is a conduit V, which extends longitudinally through the crank case to the opposite end thereof to where the oil is discharged. This renews the supply for the splash pocket in the crank case and a constant level is maintained by an overflow W which communicates with the storage chamber Q. The crank case is also provided with a series of ribs X on the bottom thereof which form separate splash pockets for each crank and render the distribution of the lubricant more uniform.

In operation, a quantity of the lubricant is maintained at each of the two different levels, viz., in the crank case and in the gear case at the upper end of the cylinders.

From the upper level the lubricant is supplied to each of the valves and its operating stem, and by reason of the annular ribs T an individual supply is maintained for each valve, even when the case is tilted. The supply of the lubricant is constantly renewed for the upper level by the pump O and through the conduit R, and the overflow from the upper level is conveyed through the housing M and conduit V to the crank case for renewing the supply in the splash pockets. It will be noted that the lubricant is fed to each level at the same end of the casing, and thus the direction of the flow is the same. Thus, where as in the case of a marine engine the case is inclined, the lubricant will flow from one cylinder to another, and from one compartment of the crank to the next adjacent, maintaining uniform lubrication for each part.

What we claim as our invention is:

1. In an engine, the combination of the engine casing having a lubricant receptacle, there being a second lubricant receptacle at a level above the first-mentioned receptacle, means for supplying lubricant to the upper receptacle, mechanism adjacent the higher level lubricated from the higher receptacle, mechanism lubricated from the lower receptacle, and an overflow from the higher to the lower receptacle.

2. In an engine, the combination of the engine casing having two lubricant receptacles therein at different levels, a series of ribs for dividing each receptacle into individual pockets having an overflow from one to another, means for supplying the lubricant to the upper receptacle at one end of the casing, and means at the same end of the casing for feeding to the lower receptacle the lubricant discharged from the upper receptacle at the opposite end of the casing.

3. In an engine, the combination of the engine casing having two lubricant receptacles therein at different levels and a drain receptacle at a still lower level, means for pumping the lubricant from the drain receptacle and conveying the same to the upper level at one end of the casing, a conduit discharging to the next lower receptacle at the same end of the casing and leading from an overflow of the upper receptacle at the opposite end of the casing, and an overflow from the lower receptacle at the latter end of the casing to the drainage receptacle.

4. In a lubricating system for engines, the combination with the cylinder and the crank case, of a lubricant receptacle at the upper end of the cylinder, a discharge conduit leading from said receptacle to the crank case, a drainage receptacle below the crank case with an overflow from the latter connecting therewith, and means for pumping the lubricant from said drainage receptacle to the receptacle at the upper end of the cylinder.

5. In a lubricating system for engines, the combination with the cylinder, the crank case and crank shaft, of a rotary valve for the cylinder, a drive mechanism between said crank shaft and said valve including a vertically-extending shaft, a lubricant receptacle for said valve, a tubular housing for said shaft forming a duct for conveying the lubricant from said receptacle to the crank case.

6. In an engine, the combination of the engine casing having a plurality of lubricant receptacles at different levels, means for supplying lubricant to the upper level and for discharging it therefrom to the lower level, and a storage chamber at a still lower level into which the lubricant is discharged.

7. In an engine, the combination with an engine casing having lubricant receptacles at two different levels, the receptacle at the lower level forming a splash pocket, an overflow chamber in which the splash pocket discharges, means for supplying lubricant to the upper level, and an overflow from the upper level to the splash pocket.

8. In an engine, a casing having a lubricant splash pocket in the crank chamber thereof and a lubricant receptacle at a higher level, a valve receiving its lubricant from its higher level, and means for maintaining both levels.

9. In an engine, a casing having a lubricant receptacle in the crank chamber thereof and a lubricant receptacle at a higher level, mechanism at the higher level lubricated from the latter receptacle, an overflow connection from the higher receptacle to the lower, an overflow from the lower receptacle, and means for returning the lubricant to the higher receptacle.

In testimony whereof we affix our signatures in presence of two witnesses.

CECIL HAMELIN TAYLOR.
HOWARD E. COFFIN.

Witnesses:
LENA M. CARLE,
ETHEL J. ESSIG.